US012764629B2

(12) United States Patent
Tang et al.

(10) Patent No.: US 12,764,629 B2
(45) Date of Patent: Oct. 13, 2026

(54) METHOD AND APPARATUS FOR SELECTING USER PLANE FUNCTION

(71) Applicant: Lenovo (Beijing) Ltd., Beijing (CN)

(72) Inventors: Tingfang Tang, Haidian District (CN); Dimitrios Karampatsis, Ruislip (GB); Jianning Liu, Xi Bei Wang Town (CN)

(73) Assignee: Lenovo (Beijing) Ltd., Beijing (CN)

( * ) Notice: Subject to any disclaimer, the term of this patent is extended or adjusted under 35 U.S.C. 154(b) by 613 days.

(21) Appl. No.: 17/791,035

(22) PCT Filed: Jan. 7, 2020

(86) PCT No.: PCT/CN2020/070740

§ 371 (c)(1),
(2) Date: Jul. 6, 2022

(87) PCT Pub. No.: WO2021/138812

PCT Pub. Date: Jul. 15, 2021

(65) Prior Publication Data

US 2023/0028216 A1 Jan. 26, 2023

(51) Int. Cl.

*H04W 40/02* (2009.01)
*H04L 61/4511* (2022.01)
*H04W 4/24* (2024.01)
*H04W 40/24* (2009.01)
*H04W 76/11* (2018.01)

(52) U.S. Cl.

CPC ......... *H04W 40/02* (2013.01); *H04L 61/4511* (2022.05); *H04W 4/24* (2013.01); *H04W 40/246* (2013.01); *H04W 76/11* (2018.02)

(58) Field of Classification Search

CPC .... H04W 72/046; H04W 72/23; H04W 72/56
See application file for complete search history.

(56) References Cited

U.S. PATENT DOCUMENTS

2018/0192390 A1* 7/2018 Li .......................... H04W 72/53
2019/0335002 A1* 10/2019 Bogineni .............. H04W 76/11
2020/0120446 A1* 4/2020 Stammers ............. H04W 72/04
2020/0329008 A1* 10/2020 Dao .................... H04L 61/5007
(Continued)

FOREIGN PATENT DOCUMENTS

CN 110169089 A 8/2019
WO 2018232241 A1 12/2018
(Continued)

OTHER PUBLICATIONS

3rd Generation Partnership Project; Technical Specification Group Core Network and Terminals; Domain Name System Procedures; Stage 3, TS 29.303 V16.1.0 (Dec. 2019), (Year: 2019).*
(Continued)

*Primary Examiner* — Nicholas A Jensen
(74) *Attorney, Agent, or Firm* — FIG. 1 Patents

(57) ABSTRACT

The present application relates to a method and apparatus for selecting user plane function. One embodiment of the subject disclosure provides a method for selecting User Plane Function (UPF), comprising: getting, by a Session Management Function (SMF), application information in a Protocol Data Unit (PDU) session during a PDU Session Establishment procedure or during Domain Name System (DNS) Query processing; and selecting, by the SMF, the UPF based on the application information.

13 Claims, 10 Drawing Sheets

(56) References Cited

U.S. PATENT DOCUMENTS

| | | | | |
|---|---|---|---|---|
| 2020/0374698 | A1* | 11/2020 | Ying | H04W 12/06 |
| 2022/0174032 | A1* | 6/2022 | Zhu | H04L 45/121 |

FOREIGN PATENT DOCUMENTS

| | | | |
|---|---|---|---|
| WO | 2019042912 | A1 | 3/2019 |
| WO | 2019157909 | A1 | 8/2019 |

OTHER PUBLICATIONS

Huawei, HiSilicon, TS 23.501: AF influenced PDU session establishment and DN authentication/authorization via NEF, 3GPP TSG SA WG2 Meeting #123, Oct. 23-Oct. 27, 2017, Ljubljana, Slovenia, S2-177383 (Year: 2017).*

Huawei , "TS 23.501: AF influenced PDU session establishment and DN authentication/authorization via NEF", 3GPP TSG SA WG2 Meeting #123, S2-177383, Ljubljana, Slovenia [retrieved Aug. 22, 2022]. Retrieved from the Internet <https://www.3gpp.org/ftp/tsg_sa/WG2_Arch/TSGS2_123_Ljubljana/Docs/?sortby=date>., Oct. 2017, 6 Pages.

PCT/CN2020/070740 , "International Preliminary Report on Patentability", PCT Application No. PCT/CN2020/070740, Jul. 21, 2022, 5 pages.

PCT/CN2020/070740 , "International Search Report and Written Opinion", PCT Application No. PCT/CN2020/070740, Oct. 13, 2020, 6 pages.

20911895.9 , "Extended European Search Report", EP Application No. 20911895.9, Aug. 24, 2023, 63 pages.

3GPP , "Domain Name System Procedures, Stage 3, (Release 16)", Technical Specification Group Core Network and Terminals, 3GPP TS 29.303, V16.1.0 [retrieved Oct. 16, 2023]. Retrieved from the Internet <https://portal.3gpp.org/desktopmodules/Specifications/SpecificationDetails.aspx?specificationId=1702>, Dec. 2019, 79 pages.

202080092326.5 , "Foreign Office Action", CN Application No. 202080092326.5, Aug. 21, 2024, 14 pages.

202080092326.5 , "Foreign Office Action", CN Application No. 202080092326.5, May 31, 2024, 18 pages.

202080092326.5 , "Foreign Office Action", CN Application No. 202080092326.5, Oct. 31, 2024, 20 pages.

* cited by examiner

| Information Name | Applicable for PCF or NEF (NOTE 1) | Applicable for NEF only | Category |
|---|---|---|---|
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s). | The potential locations of applications can be represented by AF-Service-Identifier. | Conditional (NOTE 2) |
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | Routing profile ID and/or N6 traffic routing information corresponding to each DNAI. | N/A | Optional |
| Application Relocation Possibility | Indicates whether an application can be relocated once a location of the application is selected by the 5GC. | N/A | Optional |
| UE IP address preservation indication | Indicates UE IP address should be preserved. | N/A | Optional |
| Temporal Validity Condition | Time interval(s) or duration(s). | N/A | Optional |
| ... | | | |

NOTE 1: When the AF request targets existing or future PDU Sessions of multiple UE(s) or of any UE and is sent via the NEF, the information is stored in the UDR by the NEF and notified to the PCF by the UDR.

NOTE 2: The potential locations of applications and traffic routing requirements may be absent only if the request is for subscription to notifications about UP path management events only.

Figure 1

METHOD AND APPARATUS FOR SELECTING USER PLANE FUNCTION

TECHNICAL FIELD

The subject application relates to the 3rd Generation Partnership Project (3GPP) 5G new radio (NR), especially to a method and apparatus for selecting User Plane Function (UPF).

BACKGROUND OF THE INVENTION

During a Protocol Data Unit (PDU) Session Establishment procedure, the Session Management Function (SMF) selects a UPF for the PDU session. However, the selected UPF may not be the suitable one, it follows that the selected UPF may needs to be re-selected.

Therefore, it is desirable to provide a solution for selecting UPF more efficiently.

SUMMARY

The subject disclosure provides some embodiments for selecting UPF.

Some embodiments of the subject application provide a method for selecting User Plane Function (UPF), comprising: getting, by a Session Management Function (SMF), application information in a Protocol Data Unit (PDU) session during a PDU Session Establishment procedure or during Domain Name System (DNS) Query processing; and selecting, by the SMF, the UPF based on the application information.

Other embodiments of the subject application provide an apparatus, comprising: a non-transitory computer-readable medium having stored thereon computer-executable instructions; and one or more processors coupled to the non-transitory computer-readable medium, wherein the computer-executable instructions cause the one or more processors to implement the method for selecting User Plane Function (UPF), comprising: getting, by a Session Management Function (SMF), application information in a Protocol Data Unit (PDU) session during a PDU Session Establishment procedure or during Domain Name System (DNS) Query processing; and selecting, by the SMF, the UPF based on the application information.

BRIEF DESCRIPTION OF THE DRAWINGS

FIG. 1 depicts the information elements contained in a conventional Application Function (AF) request.

DETAILED DESCRIPTION

Figure 2:
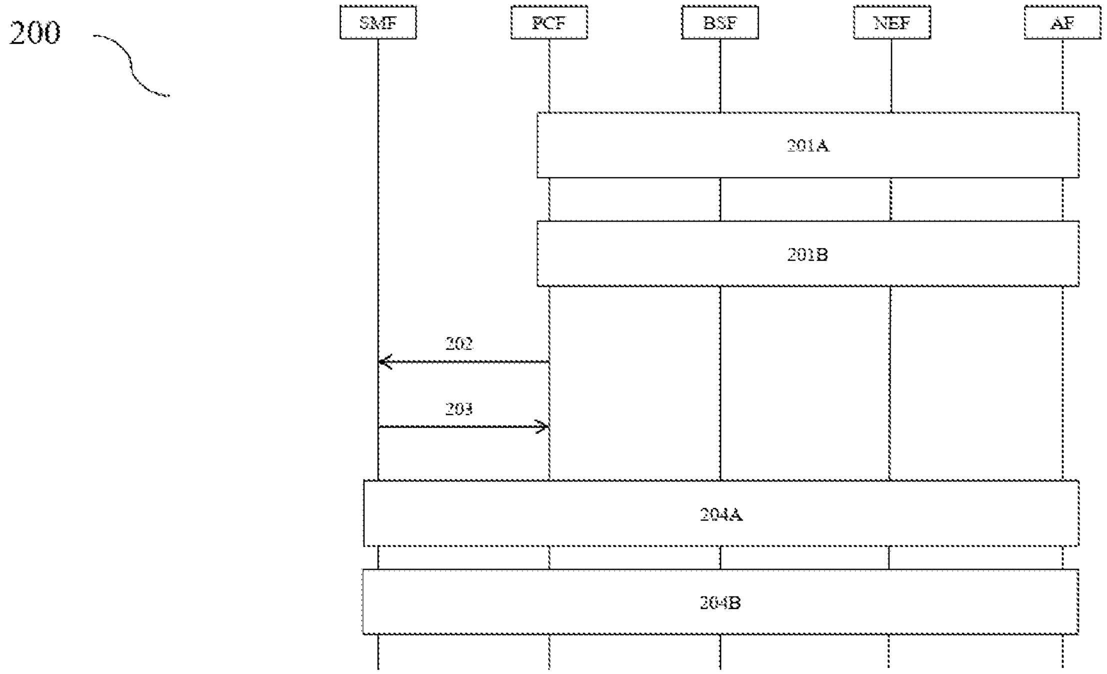
FIG. 2 depicts a flow chart 200 illustrating AF requests influencing traffic routing for Sessions identified by an UE address.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for selecting UPF. To facilitate understanding, embodiments are provided under specific network architecture and new service scenarios, such as 3GPP 5G. Persons skilled in the art know very well that, with the development of network architecture and new service scenarios, the embodiments in the present disclosure are also applicable to similar technical problems.

In the subject application, several network functions are involved. Specifically, the subject application has no intention of limiting the names of the network function to apply the method, and the application mostly relates to the following functions:

i) SMF: the SMF includes various functionalities relating to subscriber sessions, e.g. session establishment, modify and release.

ii) UPF: the UPF is similar to the roles played by the Serving/Packet Gateway in a 4G LTE system. The UPF supports features and capabilities to facilitate user plane operation. Examples include: packet routing and forwarding, interconnection to the Data Network, policy enforcement and data buffering.

iii) Access and Mobility Management Function (AMF), the AMF's primary tasks include: registration management, connection management, reachability management, mobility management and various function relating to security and access management and authorization.

iv) AF: the AF is a logical element of the 3GPP PCC framework which provides session related information to the PCRF in support of PCC rule generation.

v) Policy Control Function (PCF): the PCF supports the unified policy framework that governs network behavior. In so doing, it provides policy rules to control plane function(s) to enforce them. In order to facilitate the subscription information is gathered from the Unified Data Management function.

vi) Network Exposure Function (NEF): the NEF provides a means to securely expose the services and capabilities provided by 3GPP network functions.

vii) Unified Data Repository (UDR), the UDR is a converged repository of subscriber information and can be used to service a number of network functions.

viii) PSA (PDU Session Anchor): the PSA is the UPF providing access to the Data Network (DN). PSA selection/reselection/relocation is a subset of UPF selection/reselection/relocation.

It should be noted that the names of the parameters in the subject application are merely for the purpose of explaining the functions of the parameters, and are not limited to the names per se. Any parameters that have the functions as the parameters described in the subject application should be considered the same parameters. For example, the application identifier or the traffic routing requirements. The application identifier is the information to identify the application, which may also be called as AppID, AppId, or application identity, etc.

FIG. 1 depicts the information elements contained in a conventional Application Function (AF) request. The AF requests are sent by the AF to influence SMF routing decisions for traffic of PDU Session. The AF requests may influence UPF (re)selection and allow routing user traffic to a local access to a Data Network, which is identified by a Data Network Access Identifier (DNAI). For AF interacting with the PCF directly or via the NEF, the AF requests may contain the following information as depicted in FIG. 1: i) Traffic Description; ii) Potential Locations of Applications; iii) Target UE Identifier(s); iv) Spatial Validity Condition; v) AF transaction identifier; vi) Traffic Routing requirements, vii) Application Relocation Possibility; viii) UE IP address preservation indication, ix) Temporal Validity Condition, etc.

The information contained in the AF request has the information to identify the traffic. For instance, the traffic can be identified in the AF request by 1) a Data Network Name (DNN) and possibly slicing information, for example, the Single Network Slice Selection Assistance Information (S-NSSAI), or an AF-Service-Identifier; and 2) an application identifier or traffic filtering information, e.g. 5 Tuple. When the AF provides an AF-Service-Identifier, i.e. an identifier of the service on behalf of which the AF is issuing the request, the 5G Core maps this identifier into a target DNN and slicing information, namely, S-NSSAI. When the NEF processes the AF request the AF-Service-Identifier may be used to authorize the AF request. The application identifier refers to an application handling UP traffic and is used by the UPF to detect the traffic of the application. When the AF request is for influencing SMF routing decisions, the information is to identify the traffic to be routed. When the AF request is for subscription to notifications about UP path management events, the information is to identify the traffic that the events relate to.

The information contained in the AF request also has information on the UE(s). This may correspond to: i) individual UEs identified using GPSI, or an IP address/Prefix or a MAC address; ii) groups of UEs identified by an External Group Identifier when the AF interacts via the NEF, or Internal-Group Identifier when the AF interacts directly with the PCF; or iii) any UE accessing the combination of DNN, S-NSSAI and DNAI(s).

When the AF request targets any UE or a group of UE, the AF request is likely to influence multiple PDU Sessions possibly served by multiple SMFs and PCFs.

When the AF request targets a group of UE it provides one or several group identifiers in its request. The group identifiers provided by the AF are mapped to Internal-Group identifiers. Members of the group have this Group Identifier in their subscription. The Internal-Group Identifier is stored in Unified Data Management (UDM), retrieved by SMF from UDM and passed by SMF to PCF at PDU Session set-up. The PCF can then map the AF requests with user subscription and determine whether an AF request targeting a Group of users applies to a PDU Session.

The AF request may be targeting an individual UE address or PDU Sessions that are not identified by an UE address. When the AF requests targeting an individual UE address: such requests are routed, by the AF or by the NEF, to an individual PCF using the Binding Support Function (BSF) or by configuration as described in FIG. 2. Such requests target an on-going PDU Session. Whether the AF needs to use the NEF or not depends on local deployment.

When the AF requests targeting PDU Sessions that are not identified by an UE address: for such requests the AF shall contact the NEF and the NEF stores the AF request information in the UDR. PCF(s) that have subscribed to the modification of the AF request information receive a corresponding notification from the UDR. Such requests can target on-going or future PDU Sessions, which is described in FIGS. 3 and 4 respectively.

FIG. 2 depicts a flow chart 200 illustrating AF requests influencing traffic routing for Sessions not identified by an UE address, affecting future PDU session. Similar flow chart is also described in 5.5.3.2 in 3GPP TS 29.513. In FIG. 2, five different network functions are involved, which are: the SMF, the PCF, the BSF, the NEF, and the AF.

In step 201A, the AF sends the AF request to PCF via the NEF. In step 201B, the AF sends the AF request to PCF directly.

In steps 202 and 203, upon receipt of the AF request, the PCF invokes the Npcf_SMPolicyControl_UpdateNotify service operation to update the SMF with corresponding Policy and Charging Control (PCC) rule(s) by sending the HTTP POST request to the resource URI "{Notification URI}/update". If the AF subscribes to User Plane Path change event, the PCF would include the related subscription information within the corresponding PCC rule(s).

In step 204A, which corresponds to the step 201A, if the SMF observes PDU Session related event(s) that AF has subscribed to, the SMF invokes Nsmf_EventExposure_Notify to the AF via the NEF by sending an HTTP POST request. When receiving the Nsmf_EventExposure_Notify service operation, the NEF performs information mapping, e.g. AF Transaction Internal ID to AF Transaction ID, Subscription Permanent Identifier (SUPI) to GPSI, etc., and invokes the Nnef_TrafficInfluence_Notify service operation to forward the notification to the AF. These steps are the same as steps 307-310 in FIG. 3.

In step 204B, which corresponds to the step 201B, if the SMF observes PDU Session related event(s) that AF has subscribed to, the SMF invokes Nsmf_EventExposure_Notify to the AF directly by sending an HTTP POST request to the resource URI "{notifUri}", and the AF sends a "204 No Content" response to the SMF.

Figure 3:
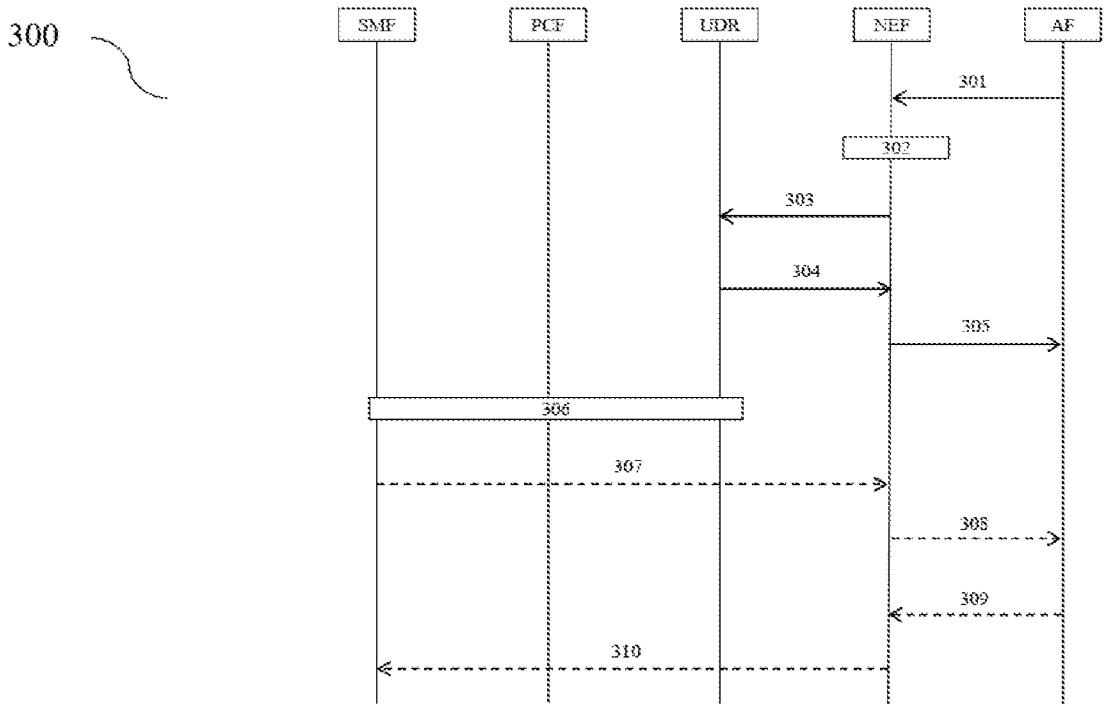
FIG. 3 depicts a flow chart 300 illustrating AF requests influencing traffic routing for Sessions not identified by an UE address, affecting future PDU session.

FIG. 3 depicts a flow chart 300 illustrating AF requests influencing traffic routing for Sessions not identified by an UE address, affecting future PDU session. Similar flow chart is also described in 5.5.3.3 in 3GPP TS 29.513. In FIG. 3, five different network functions are involved, which are: the SMF, the PCF, the UDR, the NEF, and the AF. The detailed procedure is performed as follows:

In step 301, the AF invokes the Nnef_TrafficInfluence_Create service operation, the Nnef_TrafficInfluence_Update service operation, or the Nnef_TrafficInfluence_Delete service operation to the NEF to create a new AF request, update an existing AF request, or remove an existing AF request, respectively.

In step 302, upon receipt of the AF request, the NEF authorizes it and then performs the mapping from the information provided by the AF into information needed by the 5G Core Network.

In steps 303 and 304, the UDR sends a response to the NEF. In particular, when receiving the Nnef_TrafficInfluence_Create request, the NEF invokes the Nudr_DataRepository_Create service operation to store the AF request information in the UDR and sends a "201 Created" response. When receiving the Nnef_TrafficInfluence_Update service operation, the NEF invokes the Nudr_DataRepository_Update service operation to modify the AF request information in the UDR sends a "200 OK" or "204 No Content" response accordingly. When receiving the Nnef_TrafficInfluence_Delete request, the NEF invokes the Nudr_DataRepository_Delete service operation to delete the AF requirements from the UDR and sends a "204 No Content" response.

In step 305, the NEF sends the HTTP response message to the AF correspondingly.

In step 306, the PCF retrieves the stored AF request in the UDR by invoking the Nudr_DataRepository_Query service operation during SM Policy Association Establishment procedure. The PCF generates the PCC rule(s) based on the AF request and provides it to the SMF. If the AF subscribes to User Plane Path change event, the PCF includes the Notification URI pointing to the NEF and the Notification Correlation ID assigned by NEF, i.e. AF Transaction Internal ID, within the corresponding PCC rule(s). If the AF unsubscribes from User Plane Path change event, the PCF removes the related subscription information from the corresponding PCC rule(s).

In step 307, if the SMF observes PDU Session related event(s) that AF has subscribed to, the SMF invokes the Nsmf_EventExposure_Notify service operation to the NEF by sending an HTTP POST request to the resource URI "{notifUri}".

In step 308, when receiving the Nsmf_EventExposure_Notify service operation, the NEF performs information mapping, that is: mapping AF Transaction Internal ID with AF Transaction ID, and invokes the Nnef_TrafficInfluence_Notify service operation to forward the notification to the AF by sending the HTTP request to the resource URI "notificationDestination".

In step 309, the AF sends an HTTP "204 No Content" response to the NEF.

In step 310, the NEF sends an HTTP "204 No Content" response to the PCF.

Figure 4:
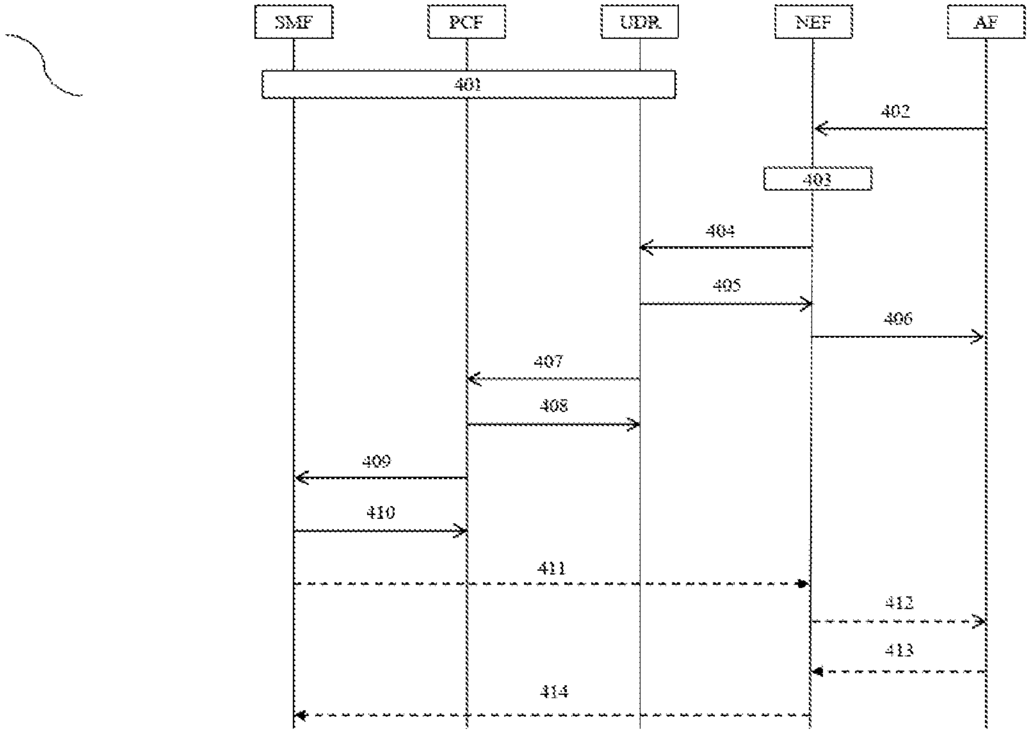
FIG. 4 depicts a flow chart 400 illustrating AF requests influencing traffic routing for Sessions not identified by an UE address, affecting ongoing PDU session.

FIG. 4 depicts a flow chart 400 illustrating AF requests influencing traffic routing for Sessions not identified by an UE address, affecting future PDU session. Similar flow chart is also described in 5.5.3.3 in 3GPP TS 29.513. In FIG. 4, five different network functions are involved, which are: the SMF, the PCF, the UDR, the NEF, and the AF, the detailed procedure is performed as follows:

In step 401, the PCF subscribes to the changes of traffic routing requirements in the UDR during SM Policy Association procedure. The steps 402-406 are the same as steps 301-305 in FIG. 3.

In steps 407 and 408, the UDR invokes the Nudr_DataRepository_Notify service operation to PCF(s) that have subscribed to modifications of AF requests by sending the HTTP POST request to the resource URI "{notificationUri}", and the PCF sends a "204 No Content" response to the UDR.

In steps 409 and 410, upon receipt of the AF request from the UDR, the PCF determines if existing PDU Sessions are potentially impacted by the AF request. For each of these PDU Sessions, the PCF invokes the Npcf_SMPolicyControl_UpdateNotify service operation to update the SMF with corresponding PCC rule(s) by sending the HTTP POST request to the resource URI "{Notification URI}/update". If the AF subscribes to User Plane Path change event, the PCF includes the Notification URI pointing to the NEF and the Notification Correlation ID, i.e. AF Transaction Internal ID, within the corresponding PCC rule(s). If the AF unsubscribes from User Plane Path change event, the PCF removes the related subscription information from the corresponding PCC rule(s).

The steps 411-414 are the same as steps 307-310 in FIG. 3.

Figure 5:
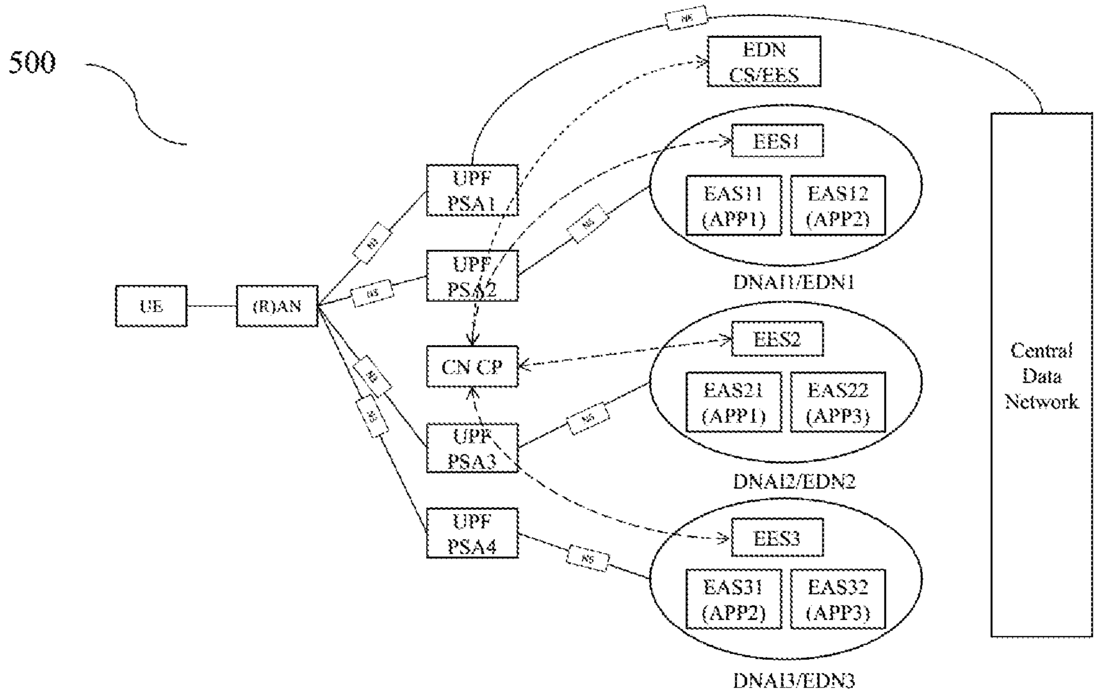
FIG. 5 depicts a scenario 500 with different applications having different Traffic Routing requirements due to application deployment.

FIG. 5 depicts a scenario 500 with different applications having different Traffic Routing requirements due to application deployment according to a preferred embodiment of the subject disclosure. Please be advised that the traffic routing requirements may have different names transmitted over different interfaces or stored in different network functions. The traffic routing requirements may include Routing profile ID and/or N6 traffic routing information corresponding to each DNAI. It should be noted that any parameters that refer to the above parameters should be considered as the traffic routing requirements of the subject disclosure, and the subject disclosure has no intention of limiting the same.

In FIG. 5, an edge platform is deployed for providing different services, thus different applications have different Traffic Routing requirements due to different application deployment. Specifically, the User Equipment (UE) is connected to the (Radio) Access Network ((R)AN), (R)AN is connected to different UPFs, UPF PSA1, UPF PSA2, UPF PSA3, and UPF PSA4 via the interface N3, UPF PSA1, UPF PSA2, UPF PSA3, an UPF PSA4 are connected to the Data Network including Central Data Network and the Edge Data Network (EDN), e.g. EDN1, EDN2, and EDN3 via the interface N6, respectively. The Core Network Control Plane (CN CP) interacts with the EDN Configuration Server (EDN CS)/Edge Enabler Server (ESS), EDN1, EDN2, and EDN3 for control plane signaling and the centralized EDN CS/EES or distributed EES can act as AF for interacting with CN CP. The EDN1 can be accessed via Data Network Access Identifier (DNAI), that is, DNAI1, and includes the first Edge Enabler Client (ESS), ESS1, and Edge Application Server (EAS) 11 is configured thereon for the first application, e.g. App1, and EAS 12 is also configured thereon for the second application, e.g. App2. The EDN2 can be accessed via DNAI2 and includes the second ESS, e.g. ESS2, and EAS 21 is configured thereon for the first application, e.g. App1, and EAS 22 is for the third application, e.g. App3. The EDN3 can be accessed via DNAI3 and includes the third ESS, e.g. ESS3, and EAS 31 is configured thereon for the second application, e.g. App2, and EAS 32 is for the third application, e.g. App3. It should be noted that FIG. 5 is just an example of an edge network, there may be other numbers of UEs, (R)ANs, . . . etc., and the EDNs may include other numbers of EASs, the subject disclosure has no intention of limiting the structure of the edge network.

The traffic routing requirements being configured per application means that different applications may have different deployments, and this information can be sent from the AF. However, while the PCF invokes a service, for example, the Nudr_DataRepository_Query service, to retrieve the stored AF influence data during Session Management (SM) Policy Association Establishment procedure, the retrieved AF influence data may include S-NSSAI and DNN and/or Internal Group Identifier or a SUPI. All the traffic routing requirements related to the S-NSSAI&DNN and/or Internal Group Identifier or SUPI will be retrieved by the PCF. Therefore, there might be some problems for the following conditions:

The first condition: during the PDU Session Establishment procedure, the SMF can select one UPF for the PDU session. Although the PCF can get all the related traffic routing requirements, but the SMF cannot retrieve the traffic routing requirements and cannot decide which one is the best PDU for the PDU session, and even if the SMF can get all the traffic routing requirements, it cannot decide which one is the best PDU for the PDU session as the SMF does not know which application is requesting for service. For example, in FIG. 5, if PSA2 is selected, which is connected to EDN1 with App1 and App2 provided thereon, then App3 is triggered right after the PDU session being established, therefore, the PSA needs to be relocated, or selected for a second time.

The second condition: the PDU Session Establishment procedure is triggered by App1. Although the SMF can obtain all the related traffic routing requirements, the SMF does not know which application will be used by the UE. In FIG. 5, the PSA1 is not connected with the EDN with App1 provided thereon, if the SMF select PSA1, which cannot provide the service the UE needed, therefore, the PSA relocation is required right after the App1 starts to transport user data.

As can be seen, both the above conditions render the SMF selecting the UPF again. That is, these problems decrease the efficiency of UPF selection for applications deployed in the edge environment. The subject disclosure intends to improve the UPF selection for PDU session for the case that different applications has different traffic routing requirements due to application deployment.

In particular, the subject disclosure aims to solve the following issues:

i) How does the SMF decide which UPF to be selected would be efficient for the specific application?

ii) What information is needed for the SMF to select the UPF?

iii) What is the UE/Network (NW) behavior to support the selection?

The subject application intends to provide methods for improving UPF selection for applications deployed in edge environment by the following manners: 1) the SMF gets the applications in the PDU session during a PDU Session Establishment procedure or during DNS Query processing; and 2) the SMF selects, or re-selects the UPF based on the application information.

Figure 6:
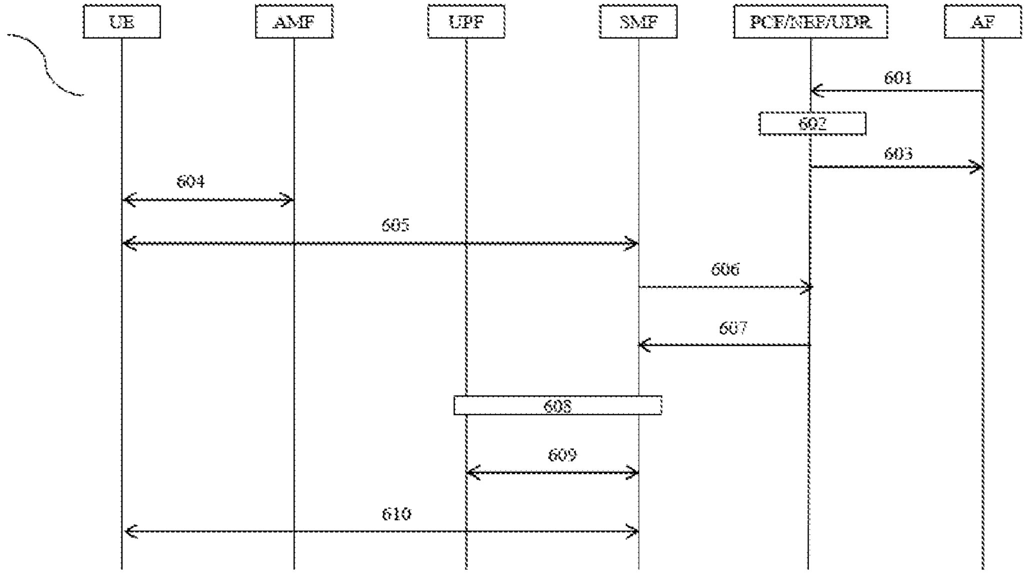
FIG. 6 depicts a flow chart 600 illustrating a method for selecting the UPF according to a preferred embodiment of the subject disclosure.

FIG. 6 depicts a flow chart 600 illustrating a method for selecting the UPF according to a preferred embodiment of the subject disclosure.

The method in FIG. 6 assumes that: 1) the Service Provider deploys the service into the EDNs and different applications have different deployments, 2) EES/EDNCS sends traffic routing requirements per DNN and NSSAI/AF-service-ID and application to the 3GPP Network, and the AF request includes that AF transaction identifier, and 4) the AF request targets future Protocol Data Unit PDU Sessions for any UE per application.

In step 601, the AF request with traffic routing requirements is sent to the Core network per application without an individual UE address, for example, the IP address or MAC address of the UE. Specifically, the AF may send Nef_TrafficInfluence_Create request (AnyUE, Traffic filter (DNN&NSSAI/AF-Service-ID/Application ID), trafficRoutes(RouteToLocation1(DNAI-1, routeInfor1 . . . ),) to the NEF.

In step 602, the NEF stores the traffic routing requirements into the UDR. The traffic routing requirements may include AF Transaction Internal ID, S-NSSAI and DNN and/or Internal Group Identifier or SUPI. In step 603, the response message is sent out for the AF request. For instance, the response may be Nnef_TrafficInfluence_Create response.

In step 604, the UE registers into the 5G system. In step 605, the UE initiates the PDU Session Establishment procedure. Specifically, the UE sends a PDU Establishment Request message. When the procedure is triggered by initiating one of the applications, the application information, for example, the application identifier, is included if available. The SMF gets the application identifier and stores the application information.

In steps 606 and 607, the SMF retrieves the SM policy using SM Policy Association Establishment procedure during the PDU Session Establishment procedure. For example, the SMF sends a Npcf_SMPolicyControl_Create message to the PCF in step 606, and receives a Npcf_SMPolicyControl Response (SmPolicyDecision (pccRules(flowInfos, appId, precedence, appReloc, addrPreserind, refTcData (reference to the TrafficeControlData (routeToLcos(dnai, routeInfo, routeProfId))))), which provides PCC rules in step 607. The Application information obtained in step 605 is used as input for retrieving the SM policy. If the PCF does not have the subscription data for the SUPI and DNN, the PCF invokes Nudr_DataRepository_Query service to retrieve the stored AF influence data from the UDR. Then the PCF makes the SM policy decision for the PDU session and the traffic routing requirements for the Application information is included in the SM policy.

In step 608, the SMF selects the UPF for the PDU session considering the traffic routing requirements and the application information. If the application triggered this PDU Session Establishment has access in the edge data network, the related DNAI and PSA will be selected.

In step 609, the SMF initiates an N4 Session Establishment procedure with the selected UPF. The SMF provides packet detection, enforcement and reporting rules to be installed on the UPF for this PDU Session.

In step 610, the PDU session is established with the PSA which is appropriate for the application that triggered this PDU Session Establishment.

Figure 7:
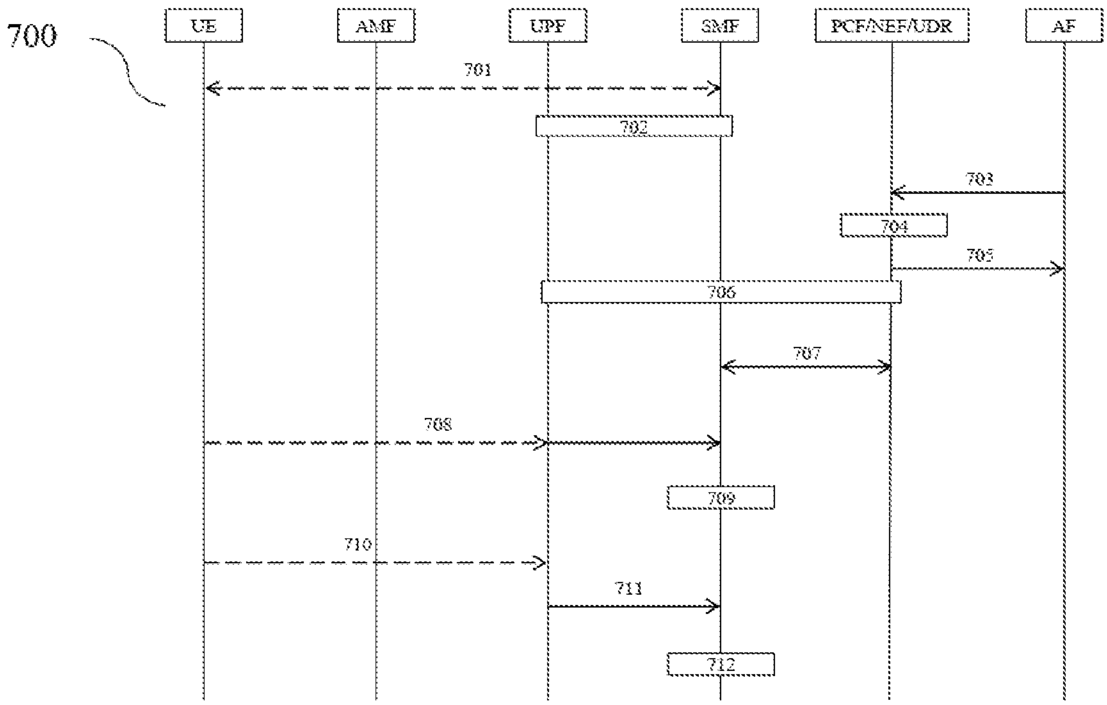
FIG. 7 depicts another flow chart 700 illustrating a method for selecting the UPF according to a preferred embodiment of the subject disclosure.

FIG. 7 depicts another flow chart 700 illustrating a method for selecting the UPF according to a preferred embodiment of the subject disclosure.

The method in FIG. 7 assumes that: 1) the PDU session has been established; 2) service provider has deployed the service, e.g. one new application into the EDNs; 3) the EES/EDN CS sends traffic routing requirements per DNN&NSSAI/AF-service-ID and application to the 3GPP Network, the AF request includes AF transaction identifier; 4) service provider has deployed the service into the EDNs and different applications have different deployment; and 5) the AF request targets the on-going PDU Sessions for the UE per application.

In steps 701 and 702, the PDU session is established. During the PDU Session Establishment procedure, the application information is included if available and the initial UPF selection can take the application information related traffic routing requirements into consideration as described in the solution of FIG. 6.

In steps 703 to 705, the AF request with traffic routing requirements are sent to the Core network per application without individual UE address and the traffic routing requirements into the UDR. The Fully Qualified Domain Name (FQDN) information for each application is also included in the AF request. More specifically, the AF transmits the Nef_TrafficInfluence_Create request (AnyUE, Traffic filter (DNN&NSSAI/AF-Service-ID/Application ID with FQDN), trafficRoutes(RouteToLocation1(DNAI-1, routeInfor1 . . . ) , , , ) to the NEF in step 703, then the NEF stores the information in the UDR and the UDR updates the information to the PCF in step 704, and the NEF sends Nef_TrafficInfluence_Create response in step 705. That is, the traffic routing requirements may include AF Transaction Internal ID, S-NSSAI and DNN and/or Internal Group Identifier or SUPI.

In step 706, the PCF triggers the SMF to set the Application Detection Rule for the application and/or the Forwarding Action Rule for the DNS query of the application. The FQDN can be included in the Packet Detection Information (PDI) as a separate parameter or as a part of the application ID parameter.

In step 707, the SMF is notified with the SM policy updated by the PCF if the PCF decides the PDU session is impacted, for example, the PCF may invoke the Npcf_SMPolicyControl_UpdateNotify service operation to update the SM policy.

In step 708, when UE initiates a DNS Query, and transmits it to the UPF, since the UPF is configured with the Application Detection Rule for the application, additionally, the Forwarding Action Rule for the DNS query of the application can also be configured to the UPF, the UPF detects the Application ID based on the FQDN included in the DNS Query, then reports the application detection. If the Forwarding Action Rule for the DNS query of the application is set that the DNS Query for the application should be forwarded the SMF, then the DNS Query for the pre-configured application ID/FQDN is forwarded to the SMF for further handling. Alternatively, if the Forwarding Action Rule for the DNS query of the application is set that the DNS Query for the application should be transmitted to the (dedicated) DNS server, then the DNS Query for the pre-configured application ID/FQDN is forwarded according to the rule.

In step 709, the SMF handles the DNS Query while received. Based on UE's location, e.g. cell ID or Tracking Area identity (TAI) of the UE, and the routing information for the Application, the SMF decides whether the DNAI needs to the changed, or whether the PSA relocation is needed. The SMF also stores the Application ID.

In steps 710 and 711, if the first uplink data packet is sent by the UE, the UPF detects the start of the application and report the application detection to the SMF based on the application detection rule. Specifically, in step 710, the UE transmits the uplink data, and in step 711, the UPF detects the application, and sends an application detection report.

In step 712, the SMF forwards the application detection information to the PCF and the PCF updates the traffic routing requirements to the SMF. Based on UE's location, e.g. cell ID or TAI of the UE, and the routing information for the Application, the SMF decides whether the DNAI needs to the changed, or whether the PSA relocation is needed.

Figure 8:
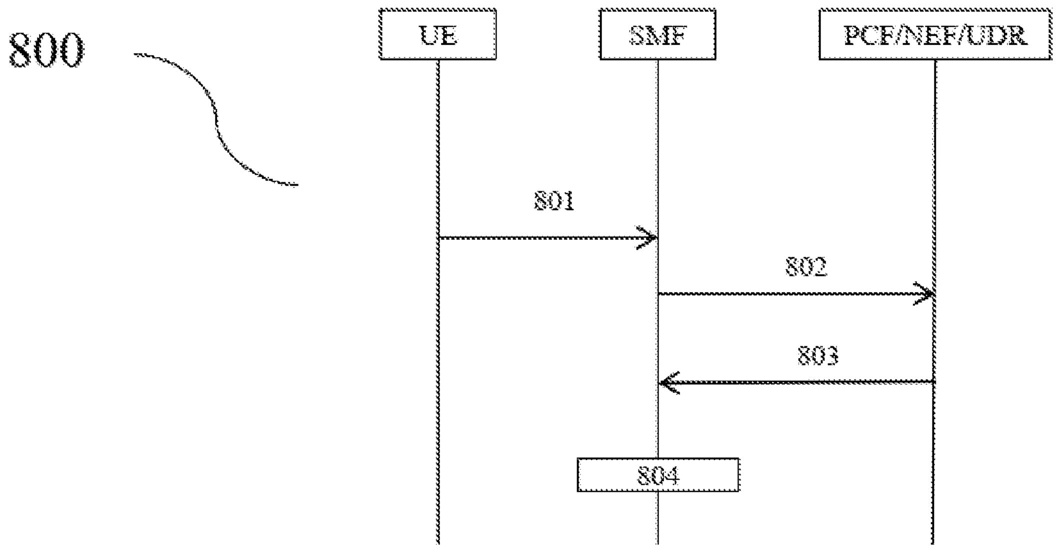
FIG. 8 depicts yet another flow chart 800 illustrating a method for selecting the UPF according to a preferred embodiment of the subject disclosure.

FIG. 8 depicts yet another flow chart 800 illustrating a method for selecting the UPF according to a preferred embodiment of the subject disclosure.

In step 801, the UE initiates the PDU Session Establishment procedure which is triggered by initiating one of the applications, the application information, e.g. the application identifier, is included in the PDU Session Establishment Request message if available. The SMF gets and stores the application information.

In steps 802 and 803, the SMF retrieves the SM policy using SM Policy Association Establishment procedure during the PDU Session Establishment procedure. The application information obtained in step 801 is used as input for retrieving the SM policy. If the PCF does not have the subscription data for the SUPI and DNN, the PCF invokes Nudr_DataRepository_Query service operation to retrieve the stored AF influence data from the UDR. Then the PCF make the SM policy decision for the PDU session and the traffic routing requirements for the Application information is included in the SM policy. In this solution, the traffic routing requirements, which is described in the table in FIG. 1, includes routing profile ID and/or N6 traffic routing requirements corresponding to each DNAI, may be included from the AF request. Furthermore, the traffic routing requirements can also be configured to the PCF, or configured to the SMF.

In step 804, the SMF selects the PSA for the PDU session considering the traffic routing requirements. If the application triggered this PDU Session Establishment has access in the edge data network, the related DNAI and PSA will be selected.

Figure 9:
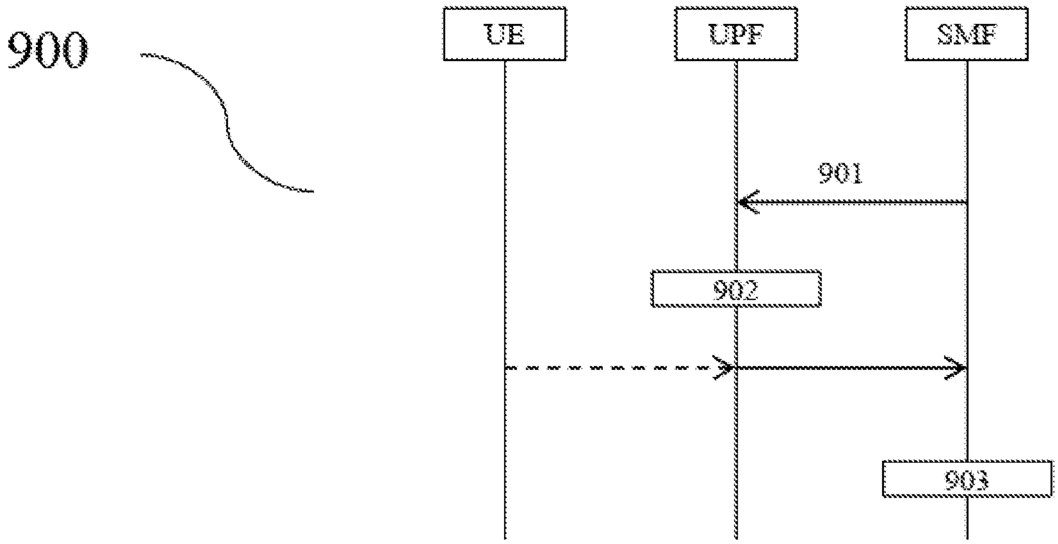
FIG. 9 depicts still another flow chart 900 illustrating a method for selecting the UPF according to a preferred embodiment of the subject disclosure.

FIG. 9 depicts still another flow chart 900 illustrating a method for selecting the UPF according to a preferred embodiment of the subject disclosure.

In step 901, the SMF sets the Application Detection Rule for the application and the Forwarding Action Rule for the DNS query of the application to the UPF. The FQDN can be included in the PDI as a separate parameter or as a part of the Application ID parameter. In this solution, the traffic routing requirements, which are described in the table in FIG. 1, includes routing profile ID and/or N6 traffic routing requirements corresponding to each DNAI, may be included from the AF request. Furthermore, the traffic routing requirements can also be configured to the PCF, or configured to the SMF.

In step 902, a UE initiate a DNS Query, and transmits it to the UPF. Since the UPF is configured with the Application Detection Rule for the application and the Forwarding Action Rule for the DNS query of the application, the UPF detects the application identifier based on the FQDN included in the DNS Query, then forwards the DNS Query for the pre-configured application ID/FQDN to the SMF.

In step 903, the SMF handles the DNS Query while received. Based on UE's location, e.g. cell ID or TAI of the UE, and the routing information (which the traffic routing requirements, can be available on the SMF, or be retrieved from the PCF) for the Application, the SMF decides whether the DNAI needs to the changed, or whether the PSA relocation is needed. The SMF also stores the Application ID.

Figure 10:
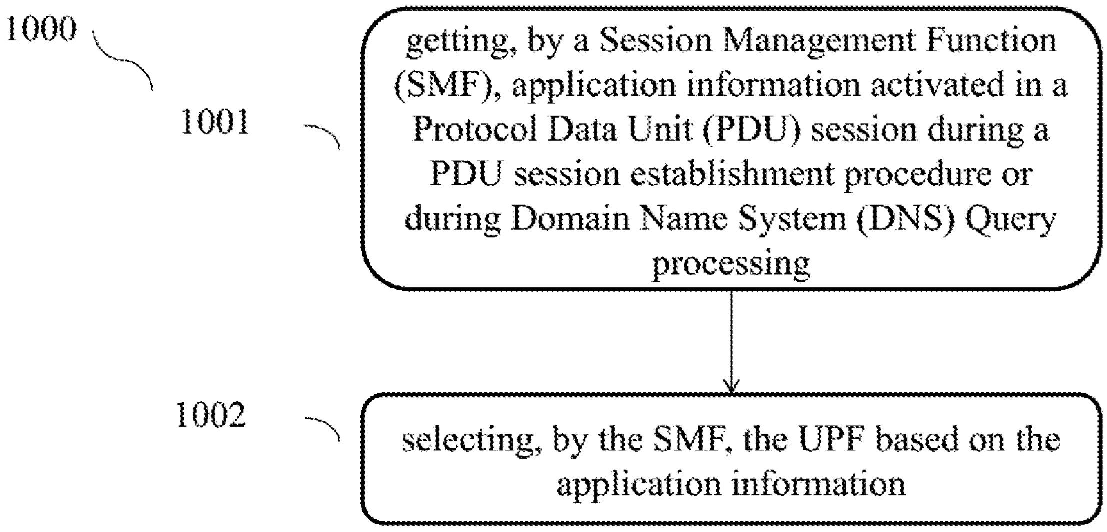
FIG. 10 illustrates a method 1000 for selecting the UPF according to a preferred embodiment of the subject disclosure.

FIG. 10 illustrates a method 1000 performed for selecting the UPF according to a preferred embodiment of the subject disclosure.

In step 1001, the SMF gets application information in a Protocol Data Unit (PDU) session during a PDU Session Establishment procedure or during DNS Query processing. In step 1002, the SMF selects the UPF based on the application information. For example, in FIG. 6, the SMF gets the application ID in step 605, and selects the UPF based on the DNAI selected from the traffic routing requirements in step 608. The traffic routing requirements can be retrieved based on application information, for example, the application ID. Alternatively, the traffic routing requirements may be configured to the PCF, or configured to the SMF.

In one embodiment, the application information is an application identifier. In another embodiment, the application information is included in a PDU Session Establishment Request message during the PDU Session Establishment procedure. For instance, the application ID is included in the PDU Session Establishment procedure in FIG. 6.

In a preferred embodiment, the SMF gets the PCC Rules for the PDU session based on the application information. The SMF further selects the UPF based on the PCC Rules. In detail, the SMF decides whether the DNAI needs to the changed, or whether the PSA relocation is needed based on UE's location, e.g. cell ID or TAI of the UE, and the routing information for the Application, The routing information in the SMF can also be retrieved from the PCF based on the application information, or configured to the SMF. The routing information in the PCF can be gotten directly or indirectly from the AF request sent from the AF, or configured to the PCF. For example, in steps 606 and 607 in FIG. 6, the SMF gets the PCC Rules using the SM Policy Association Establishment procedure during the PDU Session Establishment procedure, wherein the application information obtained in step 605 is used as input for retrieving the PCC Rules.

In a preferred embodiment, during the DNS Query processing, the UPF detects the application identifier based on a FQDN included in the DNS Query according to an application detection rule; and the UPF reports the application identifier to the SMF. For example, the UPF detects the application ID based on the FQDN, and reports the same to the SMF in step 708 in FIG. 7.

In another embodiment, the SMF provides the Application Detection Rule with FQDN corresponding to the application identifier. The SMF provides the Forwarding Action Rule for the FQDN corresponding to the application identifier; and the UPF forwards the DNS Query with the application information and/or FQDN to the SMF according to the forwarding action rule, to the SMF. For example, in step 706 in FIG. 7, the SMF sets the Application Detection Rule for the application and the Forwarding Action Rule for the DNS query of the application to the UPF. The Forwarding Action Rule for the DNS query of the application can also be configured to the UPF, the UPF detects the Application ID based on the FQDN included in the DNS Query, then reports the application detection. If the Forwarding Action Rule for the DNS query of the application is set that the DNS Query for the application should be forwarded the SMF, then the DNS Query for the pre-configured application ID/FQDN is forwarded to the SMF for further handling. Alternatively, if the Forwarding Action Rule for the DNS query of the application is set, then the DNS Query for the application should be transmitted to the (dedicated) DNS server, then the DNS Query for the pre-configured application ID/FQDN is forwarded according to the rule. For example, in step 708 in FIG. 7, the UE sends the DNS Query to the UPF, and the UPF forwards the DNS Query to the SMF.

In another embodiment, the SMF selects the UPF based on the application information and/or FQDN. For example, the SMF selects the UPF based on the application ID and/or FQDN in step 709 in FIG. 7. In detail, the SMF decides whether the DNAI needs to the changed, or whether the PSA relocation is needed based on UE's location, e.g. cell ID or TAI of the UE, and the routing information for the Application. The routing information in the SMF can also be retrieved from the PCF based on the application information, or configured to the SMF. The routing information in the PCF can be gotten directly or indirectly from the AF request sent from the AF, or configured to the PCF.

The FQDN is received from the AF and provided to the SMF by the PCF, the FQDN is included in PDI as a separate parameter or a part of the application information. Furthermore, the FQDNs for the applications can also be configured to the SMF or the PCF.

The SMF of the subject application may include a non-transitory computer-readable medium having stored thereon computer-executable instructions; and one or more processors coupled to the non-transitory computer-readable medium. The computer executable instructions can be programmed to implement a method, e.g. the method in FIG. 6, with the one or more processors.

The processors may get application information in a Protocol Data Unit (PDU) session during a PDU Session Establishment procedure or during DNS Query processing, and further selects the UPF based on the application information. The processors may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus for wireless communication, comprising:
at least one memory; and
at least one processor coupled with the at least one memory and configured to cause the apparatus to:
receive, by a session management function (SMF), application information in a protocol data unit (PDU) session during domain name system (DNS) query processing, wherein the application information comprises an application identifier for an application;
receive, by the SMF, policy and charging control (PCC) rules for the PDU session based on the application information;
select, by the SMF, a user plane function (UPF) based on the application information and the PCC rules;
receive, by the SMF from a policy control function (PCF), a fully qualified domain name (FQDN), wherein the FQDN is included in packet detection information (PDI) as one or more of a separate parameter or a part of the application information;
communicate, by the SMF to the UPF, an application detection rule for the application and the FQDN corresponding to the application identifier; and
receive, by the SMF from the UPF, the application identifier based at least in part on the FQDN.

2. The apparatus of claim 1, wherein the application information is included in a PDU session establishment request message received from a user equipment (UE) during a PDU session establishment procedure.

3. The apparatus of claim 1, wherein during the DNS query processing, the at least one processor is configured to cause the apparatus to:
detect, by the UPF, the application identifier based on the FQDN included in the DNS query according to the application detection rule.

4. The apparatus of claim 3, wherein the at least one processor is configured to cause the apparatus to:
provide, by the SMF, a forwarding action rule for the FQDN corresponding to the application identifier; and
forward, by the UPF to the SMF, the DNS query with one or more of the application information or FQDN to the SMF according to the forwarding action rule.

5. The apparatus of claim 3, wherein the at least one processor is configured to cause the apparatus to select, by the SMF, the UPF based on one or more of the application information or the FQDN.

6. The apparatus of claim 1, wherein the at least one processor is configured to cause the apparatus to select the UPF based at least in part on a traffic parameter and the application information.

7. A method performed by an apparatus, the method comprising:
receiving, by a session management function (SMF), application information in a protocol data unit (PDU) session during domain name system (DNS) query processing, wherein the application information comprises an application identifier for an application;
receiving, by the SMF, policy and charging control (PCC) rules for the PDU session based on the application information;
selecting, by the SMF, a user plane function (UPF) based on the application information and the PCC rules;
receiving, by the SMF from a policy control function (PCF), a fully qualified domain name (FQDN), wherein the FQDN is included in packet detection information (PDI) as one or more of a separate parameter or a part of the application information;
communicating, by the SMF to the UPF, an application detection rule for the application and the FQDN corresponding to the application identifier; and
receiving, by the SMF from the UPF, the application identifier based at least in part on the FQDN.

8. The method of claim 7, wherein the application information is included in a PDU session establishment request message received from a user equipment (UE) during a PDU session establishment procedure.

9. The method of claim 7, wherein during the DNS query processing, the method further comprises:
detecting, by the UPF, the application identifier based on the FQDN included in the DNS query according to the application detection rule.

10. The method of claim 9, further comprising:
providing, by the SMF, a forwarding action rule for the FQDN corresponding to the application identifier; and
forwarding, by the UPF to the SMF, the DNS query with one or more of the application information or FQDN to the SMF according to the forwarding action rule.

11. The method of claim 9, further comprising selecting, by the SMF, the UPF based on one or more of the application information or the FQDN.

12. An apparatus for wireless communication, comprising:
at least one memory; and
at least one processor coupled with the at least one memory and configured to cause the apparatus to:
receive application information in a protocol data unit (PDU) session during domain name system (DNS) query processing, wherein the application information comprises an application identifier for an application;
receive policy and charging control (PCC) rules for the PDU session based on the application information;
select a user plane function (UPF) based on the application information and the PCC rules;
receive, from a policy control function (PCF), a fully qualified domain name (FQDN), wherein the FQDN is included in packet detection information (PDI) as one or more of a separate parameter or a part of the application information;
communicate, to the UPF, an application detection rule for the application and the FQDN corresponding to the application identifier; and
receive, from the UPF, the application identifier based at least in part on the FQDN.

13. The apparatus of claim 12, wherein the at least one processor is configured to cause the apparatus to:
detect, via the UPF, the application identifier based on the FQDN included in the DNS query according to the application detection rule.

* * * * *